United States Patent
Ozawa et al.

(10) Patent No.: US 8,389,856 B2
(45) Date of Patent: Mar. 5, 2013

(54) WATERPROOF STRUCTURE OF ELECTRICAL JUNCTION BOX

(75) Inventors: Keisuke Ozawa, Shizuoka (JP);
Katsuhiro Kubota, Shizuoka (JP);
Tomohiro Sugiura, Shizuoka (JP);
Katsuyoshi Kobayashi, Shizuoka (JP);
Masao Shibata, Aichi (JP)

(73) Assignee: Yazaki Corporation, Tokyo (JP)

( * ) Notice: Subject to any disclaimer, the term of this patent is extended or adjusted under 35 U.S.C. 154(b) by 285 days.

(21) Appl. No.: 12/866,820

(22) PCT Filed: Feb. 5, 2009

(86) PCT No.: PCT/JP2009/051967
§ 371 (c)(1),
(2), (4) Date: Aug. 9, 2010

(87) PCT Pub. No.: WO2009/101893
PCT Pub. Date: Aug. 20, 2009

(65) Prior Publication Data
US 2010/0326692 A1 Dec. 30, 2010

(30) Foreign Application Priority Data
Feb. 13, 2008 (JP) ................................ 2008-032328

(51) Int. Cl.
*H05K 5/06* (2006.01)
(52) U.S. Cl. ........................ 174/50.52; 174/50; 439/76.1
(58) Field of Classification Search ............ 174/50, 174/50.52; 439/76.1, 76.2
See application file for complete search history.

(56) References Cited

U.S. PATENT DOCUMENTS
7,074,053 B2 * 7/2006 Kawakita et al. ............ 439/76.1

FOREIGN PATENT DOCUMENTS
| JP | 8-317534 | 11/1996 |
|---|---|---|
| JP | 10-257639 | 9/1998 |
| JP | 2004-297975 A1 | 10/2004 |
| JP | 2006-050753 A | 2/2006 |

OTHER PUBLICATIONS

Office Action dated Feb. 21, 2012 "Notification of Reasons for Refusal" corresponding to Japan Patent Application No. 2008-032328, with English translation.
International Search Report for International Application No. PCT/JP2009/051967 dated Feb. 24, 2009.

* cited by examiner

*Primary Examiner* — Dhirubhai R Patel
(74) *Attorney, Agent, or Firm* — Kratz, Quintos & Hanson, LLP

(57) ABSTRACT

There is provided a waterproof structure for the electrical junction box includes a stepwise portion in which a punched hole has to be provided for molding a locking projection on a peripheral wall of a main-body case. The waterproof structure prevents intrusion of a droplet from an outside into the main-body case via the punched hole and thereby improves waterproof performance. An extended portion 37d is provided on a left wall portion 22 of the main-body case 2 for moving the position of the punched hole which should be provided in the stepwise portion 35 toward the side of the locking projection 33. A hole-sealing portion 47a is provided at a edge portion 42a of the left wall portion 42 of the cover 4, the hole-sealing portion 47a is configured to cover the entire opening of the punched hole 37 moved toward the side of the locking projection 33 in a state where the cover is attached to the main-body case 2.

2 Claims, 3 Drawing Sheets

WATERPROOF STRUCTURE OF ELECTRICAL JUNCTION BOX

TECHNICAL FIELD

The present invention relates to a waterproof structure in an electrical junction box mounted in an engine room of an automobile.

BACKGROUND ART

An electrical junction box is mounted in an engine room of an automobile, the junction box being for use in delivering electrical power from a battery to various electronic components. The electrical junction box includes a plurality of connectors and a main-body case and a cover that are each integrally resin-molded and configured to accommodate therein an electrical circuit board connected to the connectors.

In the electrical junction box, there is provided a locking projection protruding on an outer surface of either one of the main-body case and the cover. Also, there is provided an engagement projection protruding on an inner surface of the other one of the main-body case and the cover. By virtue of engagement of the locking projection with the engagement projection, the cover is attached to the main-body case so as to protect the electrical circuit board accommodated within the electrical junction box from external water droplets and dusts (see the patent literature 1).

In the electrical junction box with such a configuration, in some cases it is necessary to provide a stepwise portion on a peripheral wall of the main-body case in view of external dimensions of an ECU unit incorporated in the electrical junction box.

FIG. 7 schematically illustrates a conventional electrical junction box 1 having a stepwise portion of this kind, in which the electrical junction box 1 includes a main-body case 2 and a cover 4 that are integrally resin-molded. A locking projection 52 protrudes from an outer surface of a peripheral wall 51 of the main-body case 2. By virtue of engagement of the locking projection 52 with a not-shown engagement projection protruding from an inner surface of the peripheral wall 53 of the cover 4, the cover 4 is attached to the main-body case 2 so as to protect a not-shown electrical circuit board accommodated in the electrical junction box 1 from external water droplets and dusts.

A not-shown ECU unit is mounted in the main-body case 2 via a lateral side 54 thereof. A portion of the main-body case 2 is enlarged corresponding to an external dimension of the ECU unit. Specifically, a portion 51a of the peripheral wall 51 of the main-body case 2 has a stepwise portion 55 so that the ECU unit is mounted in an enlarged portion 56 of the main-body case 22 where the stepwise portion 55 is provided.

CITATION LIST

Patent Literature

PTL 1: Japanese Patent Application Laid-Open Publication No. H08-317534

SUMMARY OF THE INVENTION

Technical Problem

In the electrical junction box 1 shown in FIG. 7, in view of layout within the engine room of the automobile, it may be a case that the peripheral wall 51a having the stepwise portion 55 configured to mount the ECU unit, out of the peripheral walls 51 of the main-body case 2, is oriented upward within the engine room. The locking projection 52 is integrally resin-molded on the outer surface of the peripheral wall 51a of the main-body case 2 oriented upward within the engine room, and, in order to integrally resin-mold the locking projection 52 on the main-body case 2, it is necessary to make a punched hole 56 in the stepwise portion 55 of the main-body case 2 due to constraints of a punching die.

Due to such constraints, when a water droplet is applied to the peripheral wall 51a of the main-body case 2 of the electrical junction box 1 mounted in the engine room, the water droplet may come via the punched hole 56 provided in the stepwise portion 55 into an inside of the main-body case 2 and thereby cause undesirable effects upon the electrical circuit board accommodated in the main-body case 2.

In view of the above-identified drawback, an object of the present invention is to provide a waterproof structure in an electrical junction box having the stepwise portion in which the punched hole has to be made for molding the locking projection on the peripheral wall of the main-body case, the waterproof structure being capable of preventing intrusion of water droplets into the main-body case through the punched hole to provide improved waterproof property.

Solution to Problem

In order to attain the above objective, there is provided a waterproof structure in an electrical junction box according to a first aspect of the present invention, in which the junction box including a plurality of connectors, a main-body case integrally resin-molded and a cover integrally resin-molded the main-body case and the cover being adapted to receive therein an electrical circuit board connected to the connectors, the cover being configured to be attached to the main-body case with a locking projection protruding on an outer surface of a peripheral wall of the main-body case brought into engagement with an engagement projection protruding on an inner surface of peripheral wall of the cover, and at least one peripheral wall portion of the peripheral wall of the main-body including a stepwise portion in which a punched hole has to be provided for molding the locking projection, characterized in that a hole-sealing portion is provided at an edge portion of a wall portion of the cover, the wall portion of the cover corresponding to the at least one peripheral wall portion of the main-body case, and the hole-sealing portion is configured to close the punched hole in the main-body case when the cover is attached to the main-body case.

The waterproof structure for the electrical junction box according to a second aspect of the present invention is characterized in that the main-body case includes a connector extending across the stepwise portion, and the stepwise portion of the main-body case includes an extended portion configured to move the punched hole to the side of the locking projection.

Advantageous Effects of the Invention

The electrical junction box with the waterproof structure according to the first aspect of the present invention includes the connectors, the main-body case integrally resin-molded and the cover integrally resin-molded the main-body case and the cover being adapted to receive therein the electrical circuit board connected to the connectors, the cover configured to be attached to the main-body case with the locking projection protruding on the outer surface of the peripheral wall of the main-body case brought into engagement with the engagement projection protruding on the inner surface of peripheral wall of the cover; at least one peripheral wall portion of the peripheral wall of the main-body including the stepwise portion in which the punched hole has to be provided for molding the locking projection, characterized in that the hole-sealing portion configured to close the punched hole in the main-body case is provided at the edge portion of the wall portion of the cover corresponding to the at least one peripheral wall portion of the main-body case, in the state where the cover is attached to the main-body case.

Accordingly, it is possible to completely close the punched hole by the hole-sealing portion of the cover attached to the main-body case, and accordingly the waterproof performance around the punched hole that has to be provided in the stepwise portion can be improved. Also, it is possible to effectively prevent intrusion of the water droplets into the inside of the main-body case via the punched hole, and accordingly the electrical circuit board and the electrical components accommodated in the main-body case can be effectively protected against being exposed to water.

In the waterproof structure of the electrical junction box of second aspect of the present invention, the main-body case includes a connector extending across the stepwise portion, and the stepwise portion of the main-body case includes an extended portion configured to shift the punched hole to the side of the locking projection. Accordingly, it is possible to effectively seal the punched hole shifted to the side of the locking projection by means of the hole-sealing portion of the cover attached to the main-body case, and prevent the water droplets from entering the inside of the main-body case via the punched hole, and thus protect the electrical circuit board and other electronic components accommodated in the main-body case from being exposed to water.

Also, since the stepwise portion of the main-body case has the extended portion adapted for the punched hole to be shifted to the position closer to the locking projection, a corresponding portion of the cover to be brought into engagement with the locking projection does not need to be partly extended to reach the position of the punched hole provided in the stepwise portion of the main-body case, so that the sealing performance of the hole-sealing portion of the cover can be kept in a sufficient degree.

REFERENCE NUMERALS

Figure 1:
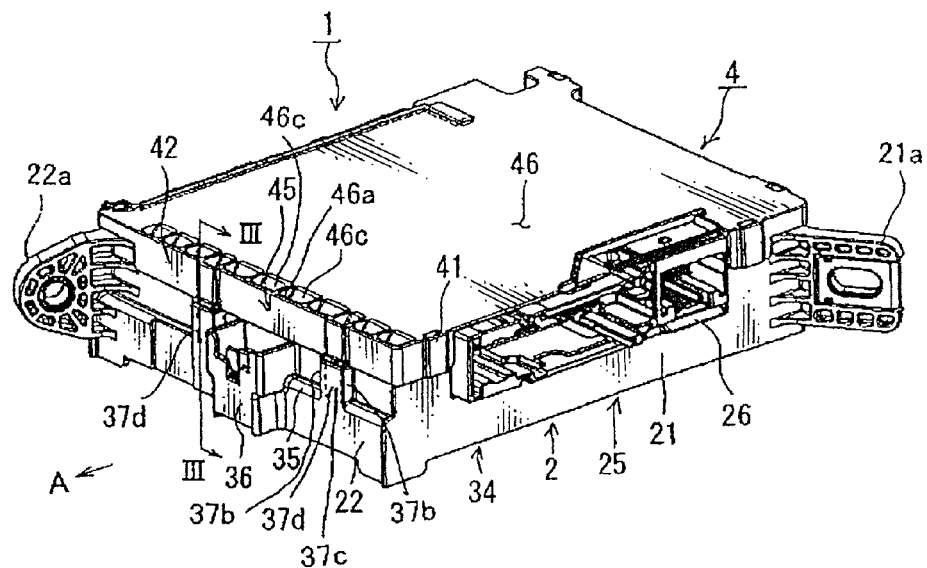
FIG. 1 is a perspective view of a waterproof structure in an electrical junction box according to one embodiment of the present invention.

1 Electrical junction box
2 Main-body case
4 Cover
22 Left wall portion
22b End portion of the left wall portion
25 Peripheral wall
29 Electrical circuit board
33 Locking projection
35 Stepwise portion
36 Connector
37 Punched hole
37a Void portion
37d Extended portion
42 Left wall portion
42a Edge portion
45 Peripheral wall
46 Upper wall portion
46a Partition wall
46b Slit
46d Tong-like piece
47 Engagement projection
47a Hole-sealing portion

DESCRIPTION OF EMBODIMENT

A waterproof structure of an electrical junction box according to one embodiment of the present invention is described with reference to FIGS. 1 to 6.

Referring to FIG. 1, there is shown an electrical junction box 1 that is adapted to be mounted in an engine room of an automobile for delivering electrical voltage from a battery to various electronic components.

Throughout the following description, FIG. 1 the explanation of components are to be made with reference to a height direction, a width direction, and a length direction that can be defined in FIG. 1 for convenience of explanation.

Referring to FIG. 1, the electrical junction box 1 includes a main-body case 2 and a cover 4 that are each integrally resin-molded and made of insulating synthetic resin.

Figure 2:
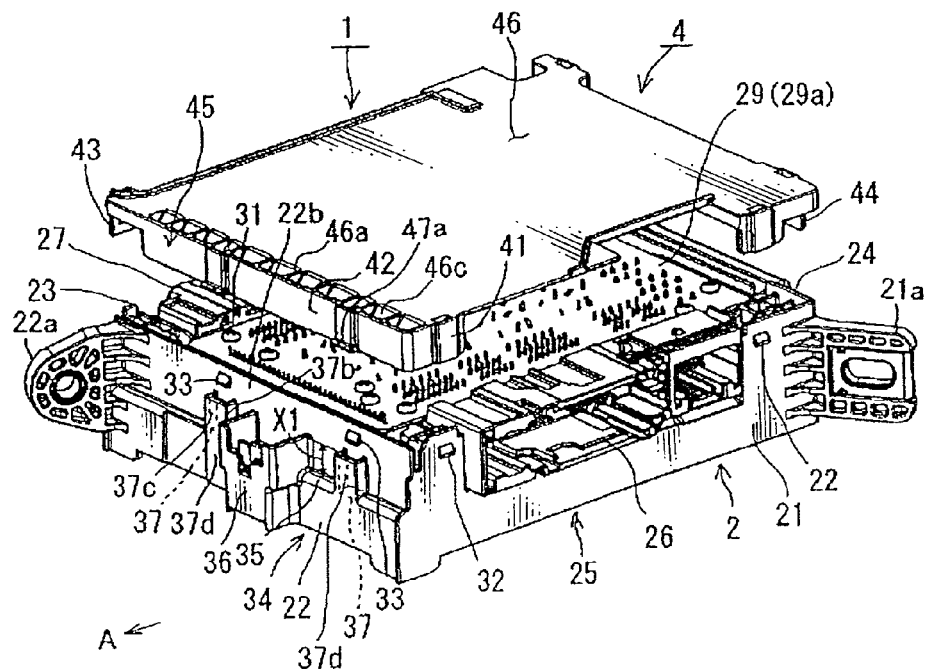
FIG. 2 is an exploded perspective view of the waterproof structure in the electrical junction box shown in FIG. 1.
Figure 3:
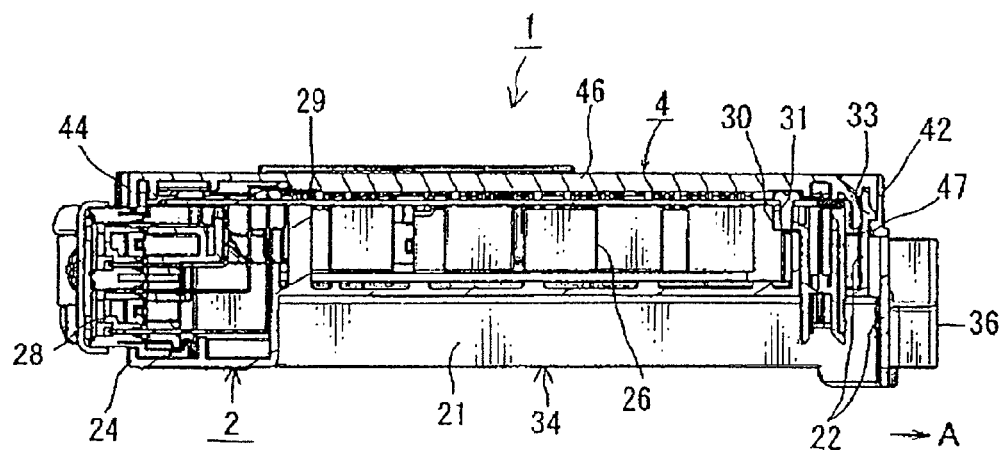
FIG. 3 is a cross-sectional view taken along the line of FIG. 1.

As shown in FIGS. 1 to 3, the main-body case 2 includes a peripheral wall 25 defined by a front wall portion 21, a left wall portion 22, a rear wall portion 23, and a right wall portion 24 that are arranged in a shape of a rectangle in plan view.

In the peripheral wall 25, connectors 26, 27, 28 are provided on the front wall portion 21, the rear wall portion 23, and the right wall portion 24.

An electrical circuit board 29 is accommodated in the main-body case 2. The electrical circuit board 29 is electrically connected to the connectors 26 to 28. The electrical circuit board 29 includes a substrate 29a made of insulating synthetic resin and a not-shown circuit pattern provided on the substrate 29a. Although not shown, electronic components are arranged on the substrate 29a. The electrical circuit board 29, as shown in FIGS. 2 and 3, secured by means of a screw 31 adapted to be screwed into a boss 30 upstanding within the main-body case 2, and horizontally arranged in an upper space in the main-body case 2.

The cover 4 is attached to the main-body case 2 such that an upper surface of the main-body case 2 is covered by the cover 4 and the electrical circuit board 29 mounted in the main-body case 2 is protected from external water droplets and dusts.

Referring to FIG. 2, the cover 4 includes a peripheral wall 45 defined by a front wall portion 41, a left wall portion 42, a rear wall portion 43, and a right wall portion 44 that are arranged in a shape of a rectangle in plan view. An upper wall portion 46 integrally continues at right angles to the peripheral wall 45 to define an upper surface of the peripheral wall 45.

As shown in FIGS. 2 and 3, the front wall portion 21, the left wall portion 22, the rear wall portion 23, and the right wall portion 24, which constitute the peripheral wall 25 of the main-body case 2, each have two locking projections 32, 33 provided on an outer surface thereof (the locking projections for the rear wall portion 23 and the right wall portion 24 are not illustrated). The locking projections 32, 33 are resin-molded integrally with the main-body case 2.

As shown in FIG. 3, the front wall portion 41, the left wall portion 42, the rear wall portion 43, and the right wall portion 44, which constitute the peripheral wall 45 of the cover 4, each have two engagement projections 47 that protrude from an inner surface thereof and are configured to be in a location in correspondence with the locking projections 32, 33 (the engagement projections for the front wall portion 41, rear wall portion 43 and the right wall portion 44 are not illustrated). The engagement projections 47 are resin-molded integrally with the cover 4.

Figure 4:
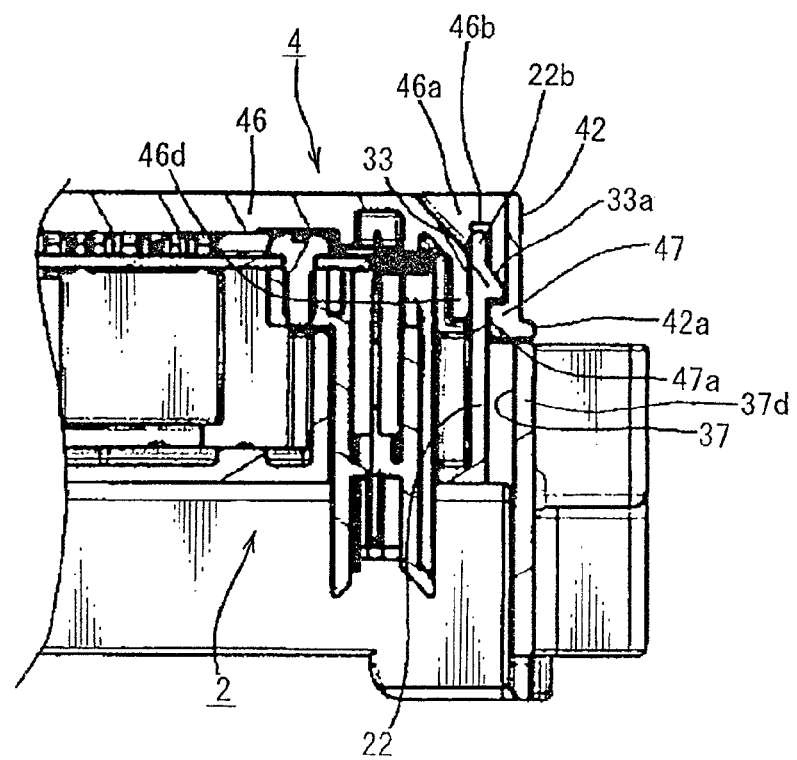
FIG. 4 is an enlarged cross-sectional view of the principal part shown in FIG. 3.
Figure 5:
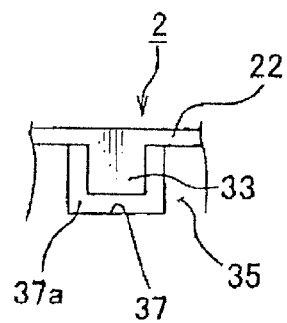
FIG. 5 is a plan view schematically illustrating the relationship between a locking projection and a punched hole shown in FIG. 4.
Figure 6:
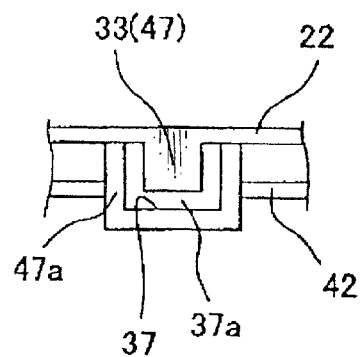
FIG. 6 is a plan view schematically illustrating the relationship between the locking projection and the engagement projection of FIG. 4, and the relationship between the punched hole and a hole-sealing portion of the engagement projection.
Figure 7:
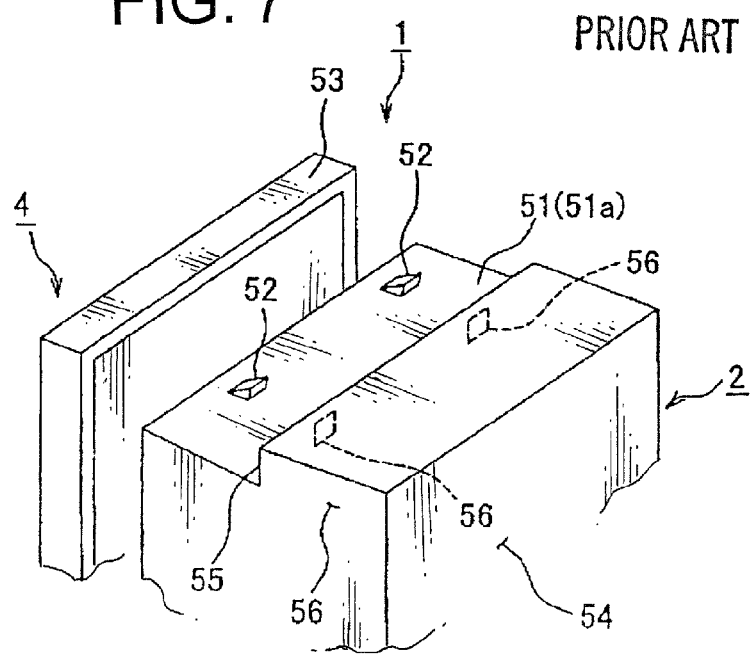
FIG. 7 is a schematic view of a waterproof structure in a conventional electrical junction box.

As shown in FIG. 4, the engagement projection 47 of the cover 4 is adapted to be guided by a tapered surface 33a of the locking projection 33 of the main-body case 2 and brought into engagement with the locking projection 33, so that the cover 4 is attached to an upper surface of the main-body case 2.

As shown in FIGS. 1 to 3, a not-shown ECU unit is mounted to the main-body case 2 via a bottom surface 34 of the main-body case 2. For that purpose, a portion of the main-body case 2 is enlarged in accordance with external dimensions of the ECU unit mounted in the main-body case 2. Specifically, the left wall portion 22, which constitutes part of the peripheral wall 25 of the main-body case 2, has a stepwise portion 35 whose lower portion is outwardly swollen, the swollen portion being lower with respect to an intermediate portion of the left wall portion 22 in the height direction, and the swollen portion being constructed to allow the ECU unit to be mounted in the case 2.

Further, in this embodiment, as shown in FIGS. 1 and 2, the left wall portion 22 of the main-body case 2, where the stepwise portion 35 is provided, includes a connector 36 extending across the stepwise portion 35 and upward from the bottom surface of the main-body case 2 to the upper surface thereof.

The locking projections 33 are provided such that the connector 36 is found therebetween, the locking projections 33 being provided on an outer surface of the left wall portion 22 of main-body case 2 where the stepwise portion 35 is provided.

In order to resin-mold the locking projection 33 integrally with the left wall portion 22, a punched hole 37 has to be provided in the stepwise portion 35 of the main-body case 2 due to constraints of punching process. Specifically, as shown in the schematic plan view of FIG. 5, in order to integrally resin-mold the locking projection 33 with the left wall portion 22 of the main-body case 2, it is necessary to provide a U-shaped void portion 37a corresponding to a thickness of a punching die around the locking projection 33. For this reason, the punched hole 37 has to be provided in the stepwise portion 35, the cross-section of the punched hole in plan view including the void portion 37a being larger than the locking projection 33.

Here, the electrical junction box 1 may be attached in the engine room in a manner that the left wall portion 22 of the main-body case 2 where the stepwise portion 35 is provided is oriented upward in accordance with layouts within the engine room of the automobile (in the direction A shown in FIGS. 1 to 3). In the electrical junction box 1 of this type, when the left wall portion 22 of the main-body case 2 is upwardly mounted by means of a screw adapted to be screwed into and passed through a mounting bracket 22a provided on the left wall portion 22 and a mounting bracket 21a provided on the front wall portion 21 of the main-body case 2 (as shown in FIGS. 1 and 2) and screwed onto a predetermined location within the engine room, then the water droplet may enter an inside of the main-body case 2 via the punched hole 37 which has to be provided in the stepwise portion 35, in a case where the water droplet is applied to the left wall portion 22 of the main-body case 2 from above the electrical junction box 1. The present invention aims at improving waterproof performance around the punched hole 37 that has to be provided in the stepwise portion 35.

In order to attain the aim, as shown in FIGS. 1 and 2, the stepwise portion 35 of the left wall portion 22 of the main-body case 2, where the punched hole 37 has to be provided, includes an extended portion 37d. The extended portion 37d extends from the stepwise portion 35 toward the side of the cover 4 attached to the main-body case 2. The extended portion 37d has a same dimension as a dimension x1 of a portion of the connector 36, the portion closer to the cover 4 than the stepwise portion 35, the connector extending across the stepwise portion 35 toward the upper side of the main-body case 2.

The extended portion 37d includes a pair of short-side portions 37b continuing at right angles to the left wall portion 22 and a long-side portion 37c that bridges the pair of short-side portions 37b The extended portion 37d has a U-shaped cross-section.

In this manner, by virtue of the extended portion 37d, the position of the punched hole 37 that has to be provided in the stepwise portion 35 is shifted to the side of the locking projection 33 so as to be proximate to the locking projection 33.

Also, in the state where the cover 4 is attached to the main-body case 2, a hole-sealing portion 47a is provided at an edge portion of the left wall portion 42 of the cover 4, where the engagement projection 47 is provided, the hole-sealing portion 47a being configured to be brought into engagement with the locking projection 33 so as to cover an entire opening of the punched hole 37 shifted by the extended portion 37d to be closer to the side of the locking projection 33. Specifically, as shown in the schematic plan views of FIGS. 4 and 6, the edge portion 42a of the left wall portion 42 of the cover 4 has the engagement projection 47 whose size is sufficient for engagement with the locking projection 33, the cross section in plan view may be the same as that of the locking projection 33. The edge portion 42a of the left wall portion 42 of the cover 4 has the hole-sealing portion 47a whose size is sufficient for covering the entire opening of the punched hole 37 including the void portion 37a provided around the locking projection 33.

In the present invention, as has been described in the foregoing, the extended portion 37d is provided in the left wall portion 22 of the main-body case 2, the extended portion 37d being provided so that the location of the punched hole 37 that has to be provided in the stepwise portion 35 can be shifted toward and close to the side of the locking projection 33. In the state where the cover 4 is attached to the main-body case 2, the hole-sealing portion 47a provided at the edge portion 42a of the left wall portion 42 of the cover 4, is configured to cover the entire opening of the punched hole 37 shifted toward the side of the locking projection 33. Accordingly, it is possible to completely close the punched hole 37 by the hole-sealing portion 47a of the cover 4 attached to the main-body case 2. Also, it is possible to effectively prevent intrusion of the water droplets into the inside of the main-body case 2 via the punched hole 37. Further, it is possible to protect the electrical circuit board 29 and the electrical components accommodated in the main-body case 2 against being exposed to water.

Also, since the stepwise portion 35 of the main-body case 2 has the extended portion 37d adapted for the punched hole 37 to be shifted to the position closer to the locking projection 33, a corresponding portion of the cover 4 to be brought into engagement with the locking projection 33 does not need to be partly extended to reach the position of the punched hole 37 provided in the stepwise portion 35 of the main-body case 2, so that the sealing performance of the hole-sealing portion 47a of the cover 4 can be kept in a sufficient degree.

As shown in FIGS. 2 to 4, in the state where the cover 4 is attached to the main-body case 2, the locking projection 33 on the outer surface of the left wall portion 22 of the main-body case 2, where the stepwise portion 35 is provided, is brought into engagement with the engagement projection 47 on the inner surface of the left wall portion 42 of the cover 4. At this point, the end portion 22b of the left wall portion 22 of the main-body case 2 is configured to be inserted into a slit 46b provided in a partition wall 46a extending from an inner surface of the upper wall portion 46 of the cover 4 toward the main-body case 2.

Specifically, as shown in FIGS. 1 and 2, openings 46c are arranged on the upper wall portion 46 of the cover 4 in one line along the left wall portion 42 of the cover 4.

Also, a plurality of partition walls 46a are provided, each defining the adjacently provided openings 46c.

Slits 46b are each provided at an end of the partition walls 46, the slits 46b being arranged in one line and each extending from the side of the main-body case 2 toward the cover 4.

The end portion 22b of the left wall portion 22 of the main-body case 2 is inserted into the slit 46b in the state where the cover 4 is attached to the main-body case 2.

Also, tong-like piece 46d is provided at the opening 46c of the upper wall portion 46 of the cover 4 in one piece with the upper wall portion 4, the tong-like pieces 46d each extending from the upper wall portion 46 toward the main-body case 2. The tong-like pieces 46d are configured to bias the end portion 22b of the left wall portion 22 of the main-body case 2 inserted into the slit 46b, biasing being exerted from the a side of the left wall portion 22 where the locking projection 33 is not provided.

By biasing the entire end portion 22b of the left wall portion 22 to be inserted into the slit 46b, the biasing being made by the tong-like pieces 46d, the locking projection 33 provided on the left wall portion 22 to be found on the front side of the end portion 22b is firmly brought into engagement with the engagement projection 47 on the side of the cover 4.

In this embodiment, the extended portion 37d extending from the stepwise portion 35 toward the cover 4 attached to the main-body case 2 is formed on the stepwise portion 35 of the left wall portion 22 of the main-body case 2 where the punched hole 37 has to be provided, so that the position of the punched hole 37 which should be provided in the stepwise portion 35 is shifted to the side of the locking projection 33. This is because the connector 36 is provided on the left wall portion 22 of the main-body case 2, the connector 36 extending across the stepwise portion 35 and extending from the bottom surface of the main-body case 2 to the upper region thereof. If there is not provided the connector 36, the punched hole may be made in the stepwise portion 35 of the left wall portion 22 of the main-body case 2, and the edge portion of the cover 4 on the side of the main-body case 2, which is attached to the main-body case 2, may be extended to the position of the stepwise portion 35, and in this manner the punched hole 37 provided in the stepwise portion 35 as such may be closed by the hole-sealing portion 47a of the extended edge portion of the cover 4.

Also, in this embodiment, the left wall portion 22 of the main-body case 2 of the electrical junction box 1 where the stepwise portion 35 is provided is upwardly oriented and mounted in the engine room. The orientation of mounting of the electrical junction box 1 may vary, and the left wall portion 22 of the main-body case 2 where the stepwise portion 35 is provided is not necessarily attached the to main-body case 2 as an upper wall of the main-body case 2.

It will be appreciated that the present invention is not limited to the above-described form. The present invention may be effectuated with various modifications made within the scope and spirit of the present invention.

The invention claimed is:

1. A waterproof structure of an electrical junction box, the junction box including a plurality of connectors, a main-body case integrally resin-molded, and a cover integrally resin-molded, the main-body case and the cover being adapted to receive therein an electrical circuit board connected to the connectors, the cover being configured to be attached to the main-body case by a locking projection protruding on an outer surface of a peripheral wall of the main-body case brought into engagement with an engagement projection protruding on an inner surface of a peripheral wall of the cover, and at least one peripheral wall portion of the peripheral wall of the main-body case including a stepwise portion in which a punched hole is provided for molding of the locking projection, the stepwise portion provided below the locking projection, characterized in that a hole-sealing portion is provided at an edge portion of a wall portion of the cover, the wall portion of the cover corresponding to the at least one peripheral wall portion of the main-body case, and the hole-sealing portion is configured to close the punched hole formed on the stepwise portion of the main-body case when the cover is attached to the main-body case.

2. The waterproof structure of the electrical junction box as set forth in claim 1, wherein the main-body case includes a connector extending across the stepwise portion, and the stepwise portion of the main-body case includes an extended portion configured to shift the punched hole to the side of the locking projection.

\* \* \* \* \*